(12) United States Patent
Lai et al.

(10) Patent No.: US 11,615,227 B2
(45) Date of Patent: *Mar. 28, 2023

(54) METHOD AND SYSTEM FOR LATCH-UP PREVENTION

(71) Applicant: Taiwan Semiconductor Manufacturing Company, Ltd., Hsinchu (TW)

(72) Inventors: Po-Chia Lai, Fremont, CA (US); Kuo-Ji Chen, Taipei County (TW); Wen-Hao Chen, Hsin-Chu (TW); Wun-Jie Lin, Hsinchu (TW); Yu-Ti Su, Tainan (TW); Rabiul Islam, Austin, TX (US); Shu-Yi Ying, Hsinchu County (TW); Stefan Rusu, Sunnyvale, CA (US); Kuan-Te Li, Taoyuan (TW); David Barry Scott, Plano, TX (US)

(73) Assignee: Taiwan Semiconductor Manufacturing Company, Ltd., Hsinchu (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/129,195

(22) Filed: Dec. 21, 2020

(65) Prior Publication Data

US 2021/0117605 A1    Apr. 22, 2021

Related U.S. Application Data

(62) Division of application No. 16/263,841, filed on Jan. 31, 2019, now Pat. No. 10,872,190.

(Continued)

(51) Int. Cl.
*G06F 30/30* (2020.01)
*G06F 30/392* (2020.01)
*H01L 27/02* (2006.01)
*G01R 31/50* (2020.01)
(Continued)

(52) U.S. Cl.
CPC ........... *G06F 30/392* (2020.01); *G01R 31/50* (2020.01); *G06F 30/327* (2020.01);
(Continued)

(58) Field of Classification Search
CPC .... G06F 30/392; G06F 30/398; G06F 30/367; G06F 30/327; G06F 2117/02; G01R 31/50; H01L 27/0207
(Continued)

(56) References Cited

U.S. PATENT DOCUMENTS 6,848,089 B2 * 1/2005 Galland ................ G06F 30/367
716/115
7,474,011 B2 * 1/2009 Lien ...................... G06F 30/367
257/373

(Continued)

FOREIGN PATENT DOCUMENTS

CN  102903719 A  1/2013
JP  2016-146504 A  8/2018

*Primary Examiner* — Jack Chiang
*Assistant Examiner* — Brandon Bowers
(74) *Attorney, Agent, or Firm* — Merchant & Gould PC

(57) ABSTRACT

An integrated circuit design method includes receiving an integrated circuit design, and determining a floor plan for the integrated circuit design. The floor plan includes an arrangement of a plurality of functional cells and a plurality of tap cells. Potential latchup locations in the floor plan are determined, and the arrangement of at least one of the functional cells or the tap cells is modified based on the determined potential latchup locations.

20 Claims, 12 Drawing Sheets

Related U.S. Application Data

(60) Provisional application No. 62/698,645, filed on Jul. 16, 2018.

(51) Int. Cl.
*G06F 30/327* (2020.01)
*G06F 30/367* (2020.01)
*G06F 30/398* (2020.01)
*G06F 117/02* (2020.01)

(52) U.S. Cl.
CPC .......... *G06F 30/367* (2020.01); *G06F 30/398* (2020.01); *H01L 27/0207* (2013.01); *G06F 2117/02* (2020.01)

(58) Field of Classification Search
USPC ......................................................... 716/119
See application file for complete search history.

(56) References Cited

U.S. PATENT DOCUMENTS

| | | |
|---|---|---|
| RE42,776 E | 10/2011 | Clark et al. |
| 8,482,070 B1 | 7/2013 | Flatresse et al. |
| 10,872,190 B2 | 12/2020 | Lai et al. |
| 2002/0105049 A1* | 8/2002 | Barney ................. H01L 27/118 326/103 |
| 2008/0122473 A1 | 5/2008 | Lien et al. |
| 2013/0026580 A1 | 1/2013 | Morimoto et al. |
| 2014/0223399 A1* | 8/2014 | Sato ........................ G06F 30/30 716/109 |
| 2015/0102421 A1 | 4/2015 | Morimoto et al. |
| 2015/0227669 A1* | 8/2015 | Joshi ..................... G11C 11/417 716/115 |
| 2016/0336343 A1 | 11/2016 | Kuo et al. |

\* cited by examiner

METHOD AND SYSTEM FOR LATCH-UP PREVENTION

CROSS REFERENCE TO RELATED APPLICATION

This application is a divisional of application Ser. No. 16/263,841, filed Jan. 31, 2019, now U.S. Pat. No. 10,872, 190, which claims the benefit of U.S. Provisional Application No. 62/698,645, filed Jul. 16, 2018, and titled "Tap Cells," the disclosure of which is hereby incorporated herein by reference.

BACKGROUND

Integrated circuits typically include thousands of components having complex interrelationships. These circuits are generally designed using highly automated processes known as electronic design automation (EDA). EDA begins from a functional specification provided in a hardware description language (HDL) and continues through the specification of a circuit design including the specification of elementary circuit components called cells, the physical arrangement of the cells, and the wiring that interconnects the cells. The cells implement logic or other electronic functions using a particular integrated circuit technology.

EDA can be divided into a series of stages such as synthesis, placement, routing, etc. Each of these steps can involve selecting cells from a library of cells. Typically, a very large number of different circuit designs using various cell combinations can meet a functional specification for a circuit. Latchup is a type of short circuit that sometimes occurs in integrated circuits due to parasitic bipolar transistors formed by adjacent junctions in the integrated circuit. EDA tools may include tap cells in integrated circuit designs, which can provide a body bias of transistors to prevent latchup.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
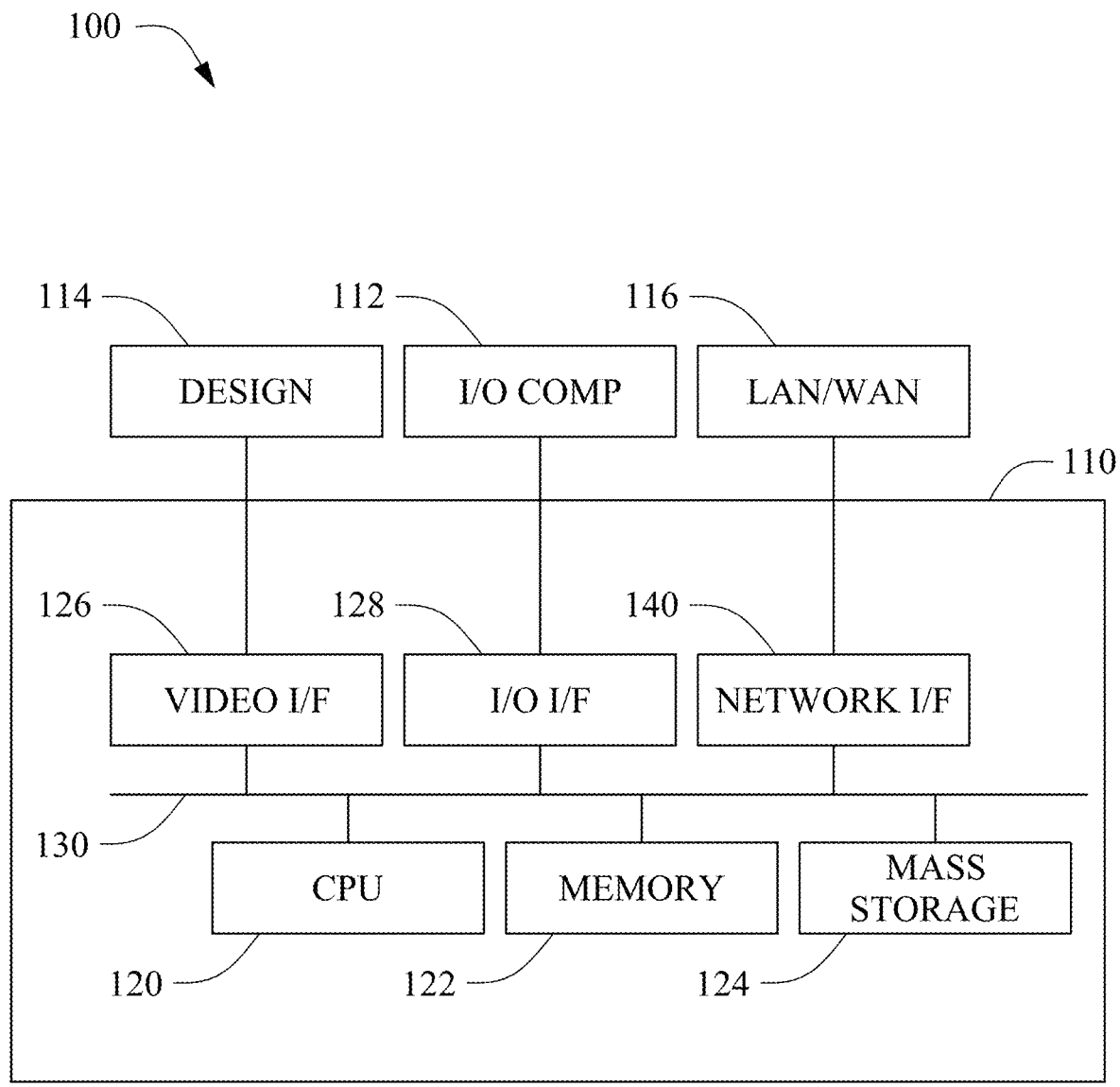
FIG. 1 is a block diagram illustrating an example of a processing system in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Electronic Design Automation (EDA) tools and methods facilitate the design, partition, and placement of microelectronic integrated circuits on a semiconductor substrate. This process typically includes turning a behavioral description of the circuit into a functional description, which is then decomposed into logic functions and mapped into cells using a standard cell library. Once mapped, a synthesis is performed to turn the structural design into a physical layout, a clock tree is built to synchronize the structural elements, and the design is optimized post layout.

FIG. 1 is a block diagram illustrating an example of a processing system 100 in accordance with some embodiments disclosed herein. The processing system 100 may be used to implement an EDA system in accordance with various processes discussed herein. The processing system 100 includes a processing unit 110, such as a desktop computer, a workstation, a laptop computer, a dedicated unit customized for a particular application, a smart phone or tablet, etc. The processing system 100 may be equipped with a display 114 and one or more input/output devices 112, such as a mouse, a keyboard, touchscreen, printer, etc. The processing unit 110 also includes a central processing unit (CPU) 120, memory 122, a mass storage device 124, a video adapter 126, and an I/O interface 128 connected to a bus 130.

The bus 130 may be one or more of any type of several bus architectures including a memory bus or memory controller, a peripheral bus, or video bus. The CPU 120 may comprise any type of electronic data processor, and the memory 122 may comprise any type of system memory, such as static random access memory (SRAM), dynamic random access memory (DRAM), or read-only memory (ROM).

The mass storage device 124 may comprise any type of storage device configured to store data, programs, and other information and to make the data, programs, and other information accessible via the bus 130. The mass storage device 124 may comprise, for example, one or more of a hard disk drive, a magnetic disk drive, an optical disk drive, flash memory, or the like.

The term computer readable media as used herein may include computer storage media such as the system memory and storage devices mentioned above. Computer storage media may include volatile and nonvolatile, removable and non-removable media implemented in any method or technology for storage of information, such as computer readable instructions, data structures, or program modules. The memory 122 and mass storage device 124 are computer storage media examples (e.g., memory storage). The mass storage device may further store a library of standard cells, as will be discussed further herein below.

Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the processing device 100. Any such computer storage media may be part of the processing device 100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The video adapter 126 and the I/O interface 128 provide interfaces to couple external input and output devices to the processing unit 110. As illustrated in FIG. 1, examples of input and output devices include the display 114 coupled to the video adapter 126 and the I/O device 112, such as a mouse, keyboard, printer, and the like, coupled to the I/O interface 128. Other devices may be coupled to the processing unit 110, and additional or fewer interface cards may be utilized. For example, a serial interface card (not shown) may be used to provide a serial interface for a printer. The processing unit 110 also may include a network interface 140 that may be a wired link to a local area network (LAN) or a wide area network (WAN) 116 and/or a wireless link.

Embodiments of the processing system 100 may include other components. For example, the processing system 100 may include power supplies, cables, a motherboard, removable storage media, cases, and the like. These other components, although not shown, are considered part of the processing system 100.

In some examples, software code is executed by the CPU 120 to analyze a user design to create a physical integrated circuit layout. The software code may be accessed by the CPU 120 via the bus 130 from the memory 122, mass storage device 124, or the like, or remotely through the network interface 140. Further, in some examples, the physical integrated circuit layout is created based on a functional integrated circuit design, which may be received though the I/O interface 128 and/or stored in the memory 122 or 124 in accordance with various methods and processes implemented by the software code.

A standard cell can include an entire device, such as a transistor, diode, capacitor, resistor, or inductor, or can include a group of several devices arranged to achieve some particular function, such as an inverter, a flip-flop, a memory cell, or an amplifier, among others. In addition to making functional design easier to conceptualize, the use of standard cells can reduce verification time for design rule checking (DRC) of the layout features within the IC, because a standard cell that is repeated throughout the layout can be checked a single time in DRC rather than each instantiation being checked individually. Based on the received functional circuit description, the system 100 is configured to select standard cells from the cell library.

Figure 2:
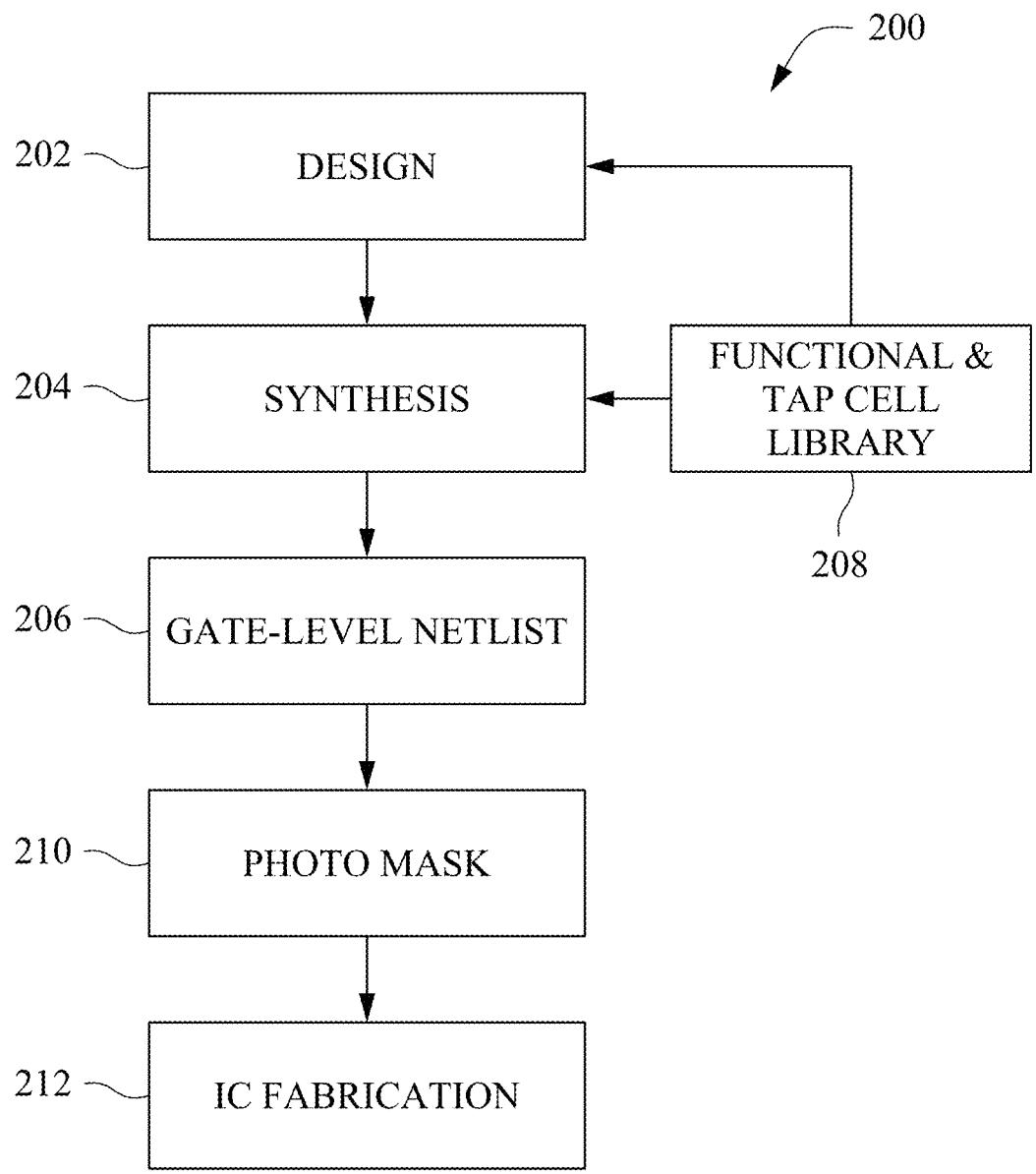
FIG. 2 is a process flow diagram illustrating aspects of an example of an integrated circuit design method in accordance with some embodiments.

FIG. 2 generally illustrates an example integrated circuit design and fabrication process 200 that may be implemented by the processing system 100 for generating a physical layout from a user supplied behavioral/functional design. The user design 202 specifies the desired behavior or function of the circuit based upon various signals or stimuli applied to the inputs of the overall design, and may be written in a suitable programming language. The design 202 may be uploaded into the processing unit 110 (see FIG. 1) through the I/O interface 128 by a user. Alternatively, the design 202 may be uploaded and/or saved on the memory 122 or mass storage device 124, or the design 202 may be uploaded through the network interface 140 from a remote user.

A synthesis 204 is performed on the design, in which the behavior and/or functions desired from the design 202 are transformed to a functionally equivalent logic gate-level circuit description by matching the design to standard cells, such as from one or more cell libraries 208. The cell library 208 contains a listing of pre-designed components, or functional cells, each of which may perform a predetermined function. The cells are stored in the cell library 208 as information comprising internal circuit elements, the various connections to these circuit elements, a pre-designed physical layout pattern that includes the unit height of each cell along with the cell's designed power rails, dopant implants, wells, etc. Additionally, the stored cell may also comprise a shape of the cell, terminal positions for external connections, delay characteristics, power consumption, etc. The synthesis 204 results in a functionally equivalent logic gate-level circuit description, such as a gate-level netlist 206. The cell library 208 may be stored, for example, in one or more databases contained in the mass storage 124. Based on the gate-level netlist 206, a photolithographic mask 210 may be generated, which is used to fabricate the integrated circuit 212.

The cell library 208 may further include tap cells. Tap cells prevent the undesirable latchup of integrated circuits, which can result from parasitic bipolar transistors formed in integrated circuits. Through the tap cells, n-well regions are coupled to VDD power rails, and p-well regions or p-type substrates are coupled to VSS power rails (typically electrical ground).

Figure 3A:
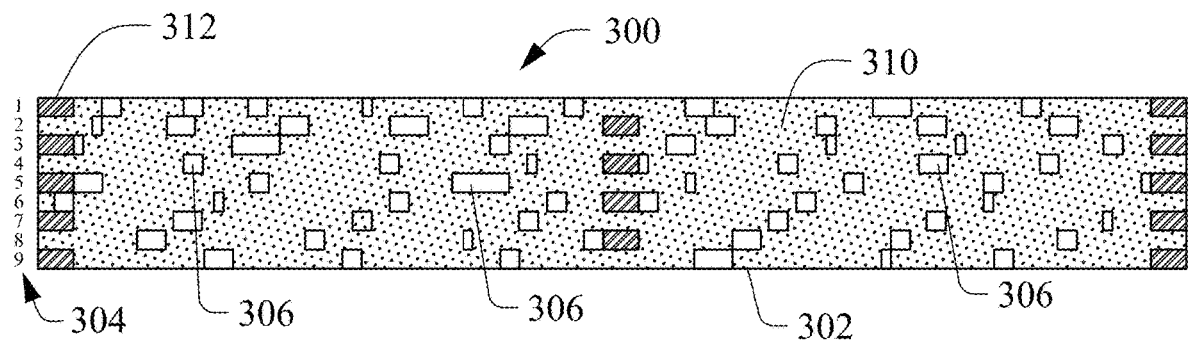
FIGS. 3A, 3B, and 3C illustrate aspects of an example of an integrated circuit floor plan in accordance with some embodiments.
Figure 3B:
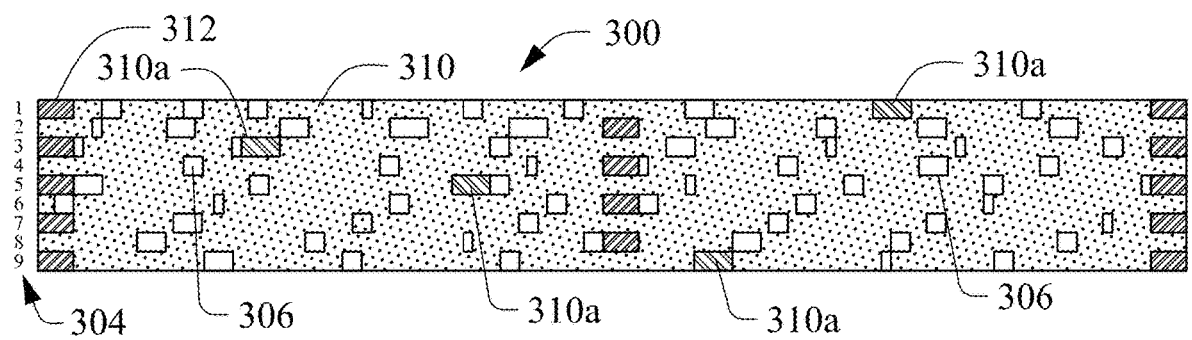
Figure 3C:
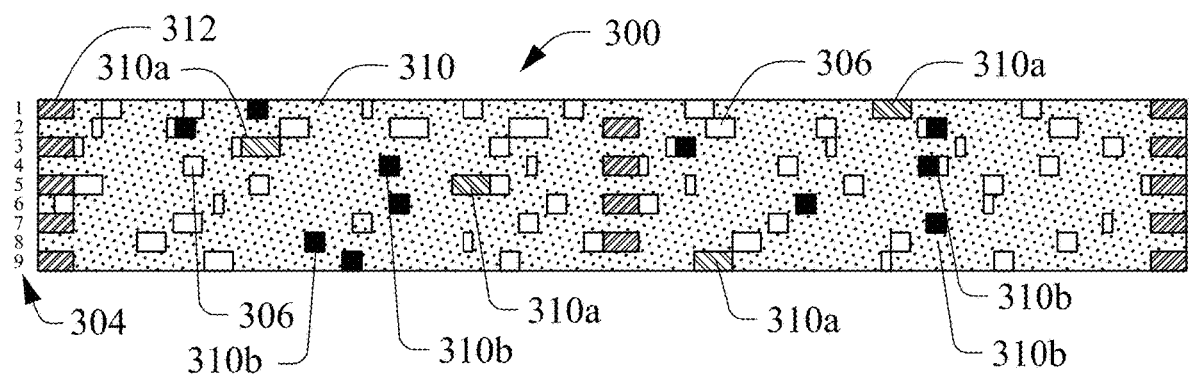

In some examples, a design "floorplan" is determined that includes a plurality of rows into which the standard cells are arranged. FIGS. 3A-3C illustrate various iterations of an example floor plan 300. The floor plan 300 provides the layout for an integrated circuit, such as would be manufactured according to the method shown in FIG. 2. As such, the floor plan 300 illustrates the arrangement of functional cells 310 and tap cells 312 in rows 304 on a substrate 302.

In some integrated design processes, a predetermined, maximum tap-to-tap distance may be specified, and tap cells are distributed in the floor plan accordingly. This maximum tap-to-tap distance may be determined, for example, using test chips with arrays of inverters that provide a worst case latchup condition to determine cell placements so as to avoid latchup. However, depending on the actual functional design for the integrated circuit device to be manufactured, such maximum tap-to-tap distances do not determine or even estimate the potential latchup susceptibility across actual cell distributions for a particular design. This can result in providing too many tap cells, causing area waste for designs where a lower tap density would suffice, and further potentially resulting in timing degradation such as in high-performance products. In such high-performance designs, higher tap density may interfere with optimal cell placement, making critical wiring paths longer. Further, some areas may be provided with insufficient tap cells, resulting in latchup.

In accordance with some aspects of the present disclosure, latchup susceptibility is determined for in standard place and route (P&R) blocks of a floor plan. Additionally, solutions to address critical latchup areas are provided.

Referring to FIG. 3A, in some examples, the tap cells 312 are initially located in predetermined locations in the rows 304. In the example shown in FIG. 3A, the tap cells 312 are initially positioned to extend vertically in columns at either side of the floor plan 300, as well as in a vertical column in the center area of the floor plan 300. Note that the floor plan 300 further includes locations 306 where there are no functional cells 310 or tap cells 312 initially placed.

Figure 4:
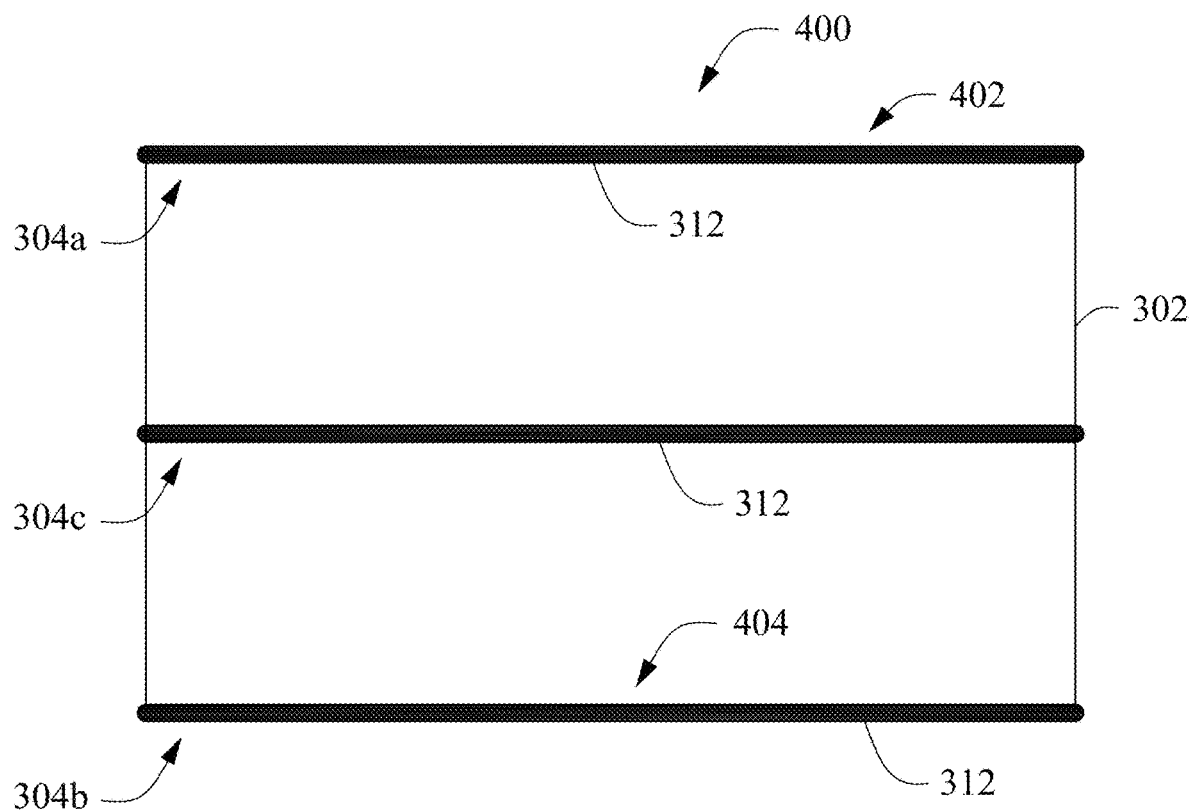
FIG. 4 illustrates aspects of another example of an integrated circuit floor plan in accordance with some embodiments.

FIG. 4 illustrates another initial floor plan 400, prior to the placement of the functional cells 310. In the example of FIG. 4, certain rows 304 of the floor plan 400 include only tap cells 312. The substrate 302 in the floor plan 400 shown in FIG. 4 defines an outer periphery having a first, or top border 402 and a second, or bottom border 404 opposite the first border 402. In the floor plan 400 shown in FIG. 4, a first row 304a directly adjacent the top border 402 and a second row 304b directly adjacent the bottom border 404 include only tap cells 312. Additionally, another row 304c extending horizontally across the center of the floor plan 400 includes only tap cells 312. Adding such dedicated rows of tap cells greatly reduces the potential for latchup in integrated circuit devices, without consuming significant area in the floor plan 400. The illustrated example shows three horizontal rows of tap cells, though in other embodiments more or fewer rows of tap cells could be provided. Typically, tap cells are provided in vertical columns up-and-down a floor plan. The rows 304 shown in the example of FIG. 4 include only tap cells, so the floor plan provides additional tap cells as compared to prior tap cell implementations. Additionally, equally spacing the tap cell rows 304 from the top and bottom borders 402, 404 helps further reduce latch up potential.

Figure 5:
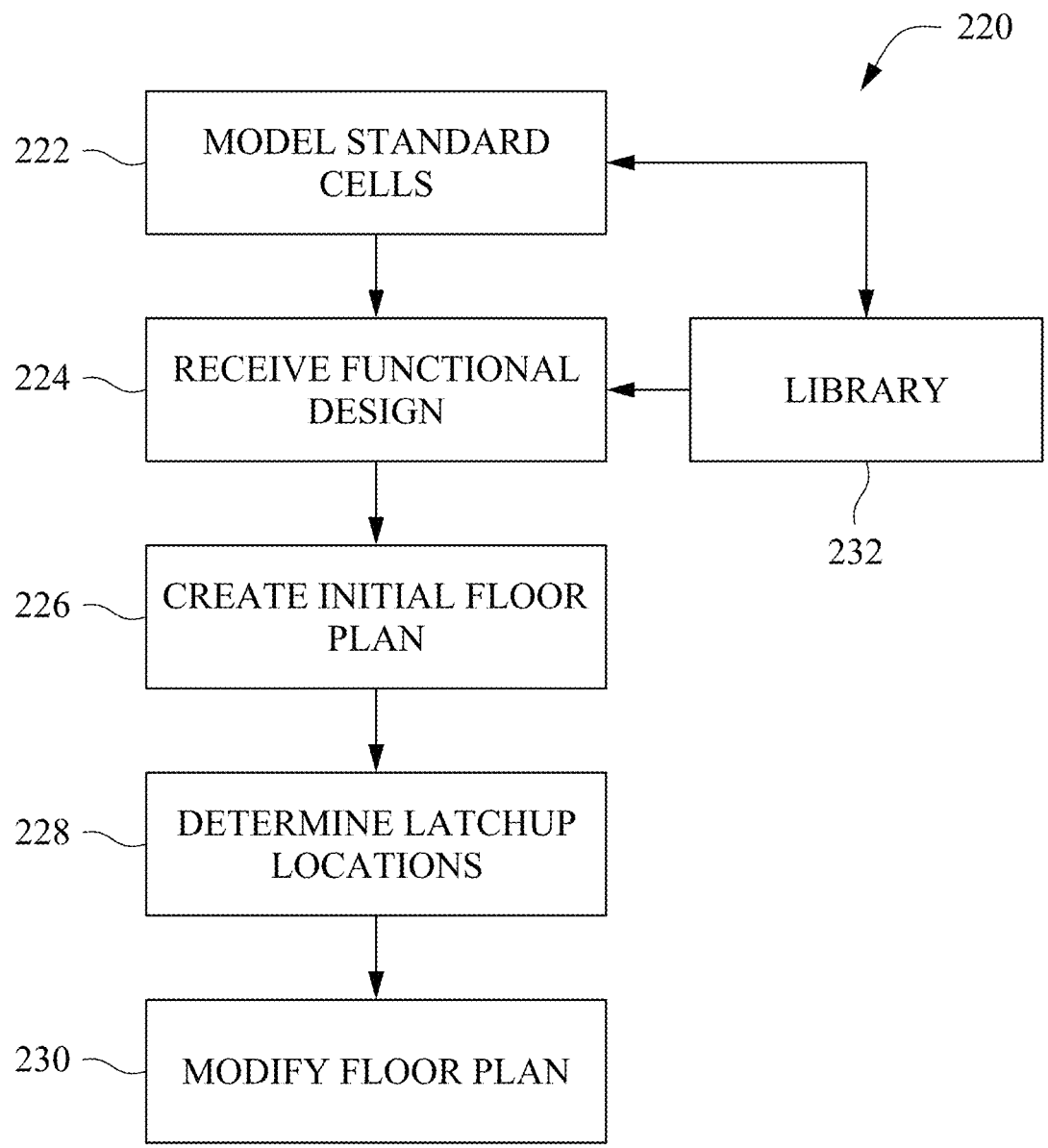
FIG. 5 is a process flow diagram illustrating aspects of an example of an integrated circuit design method in accordance with some embodiments.

Referring now to FIG. 5, further aspects of an example method 220 for designing an integrated circuit are illustrated. Various steps of the method 220 are performed, for example, by the processor 120 and system 100 shown in FIG. 1. At an operation 222, the standard cell models are created for each of the standard cells stored in the cell library 232. The cell models may further be stored in the cell library 232.

Figure 6:
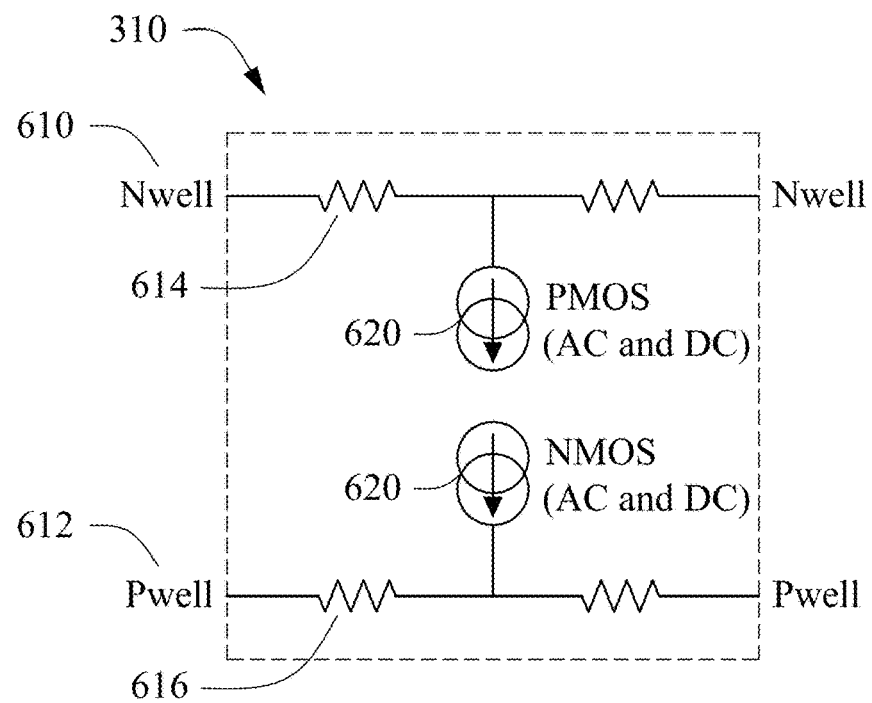
FIG. 6 is a schematic diagram illustrating an example of a standard cell model in accordance with some embodiments.
Figure 7:
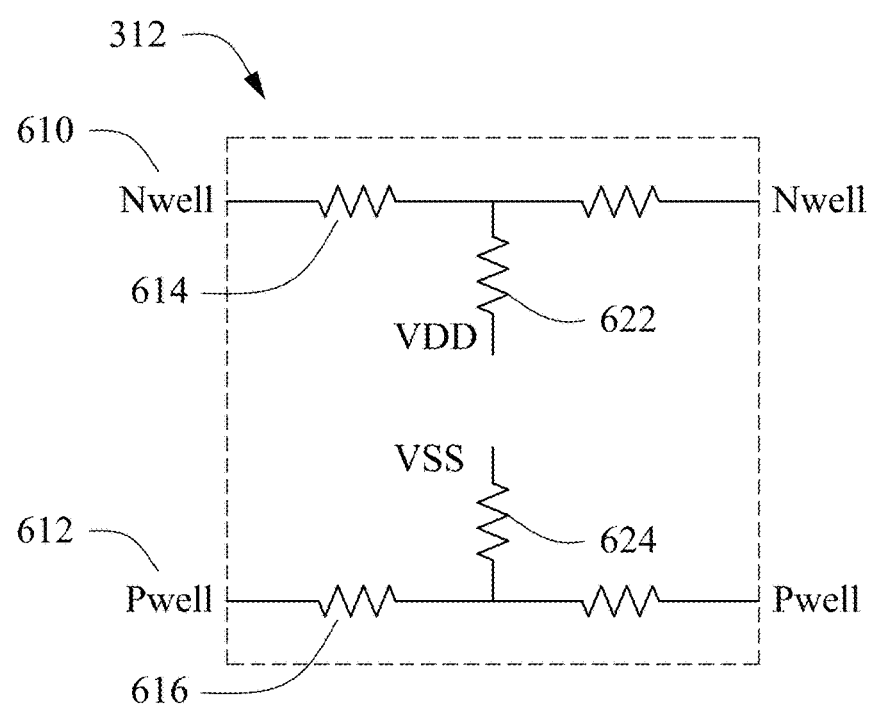
FIG. 7 is a schematic diagram illustrating another example of a standard cell model in accordance with some embodiments.

FIGS. 6 and 7 conceptually illustrate aspects of the cell model creation process for standard functional cells 310 and tap cells 312, respectively, as shown in the operation 222 of FIG. 5. As shown in FIG. 6, P-wells 612 and N-wells 610 for the functional cells 310 may be modeled by using distributed resistors 614 and 616, respectively. To characterize DC and AC currents of the cells 310, current sources 620 are provided to inject current into each well 610, 612. In some implementations, the current is injected in the middle of the cell 310. FIG. 7 illustrates a model for a tap cell 312, in which the continuous P-well 612 and N-well 610 are modeled by the distributed resistors 616, 614. To model pickup resistance, resistors 622, 624 are connected in the middle of the cell resistors 614, 616, between the respective voltage sources VDD and VSS. The illustrated models shown in FIGS. 6 and 7 provide a simple and elegant model to characterize DC and AC currents of the cells 310, 312. In other examples, additional components such as capacitors and inductors could be added to the models to characterize further aspects of the cells as necessary.

Figure 8:
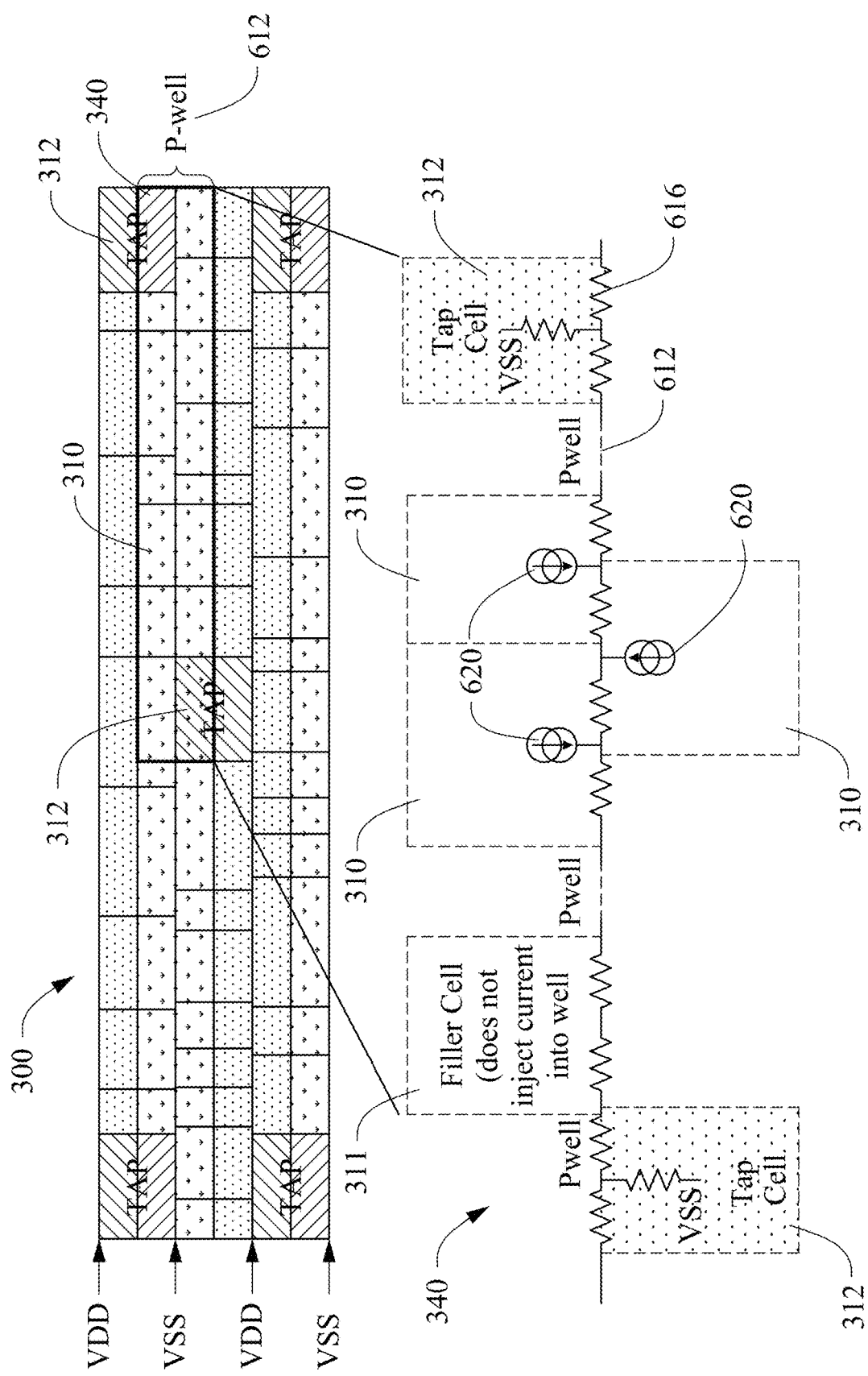
FIG. 8 illustrates an example of a cell modeling process in accordance with some embodiments.
Figure 9:
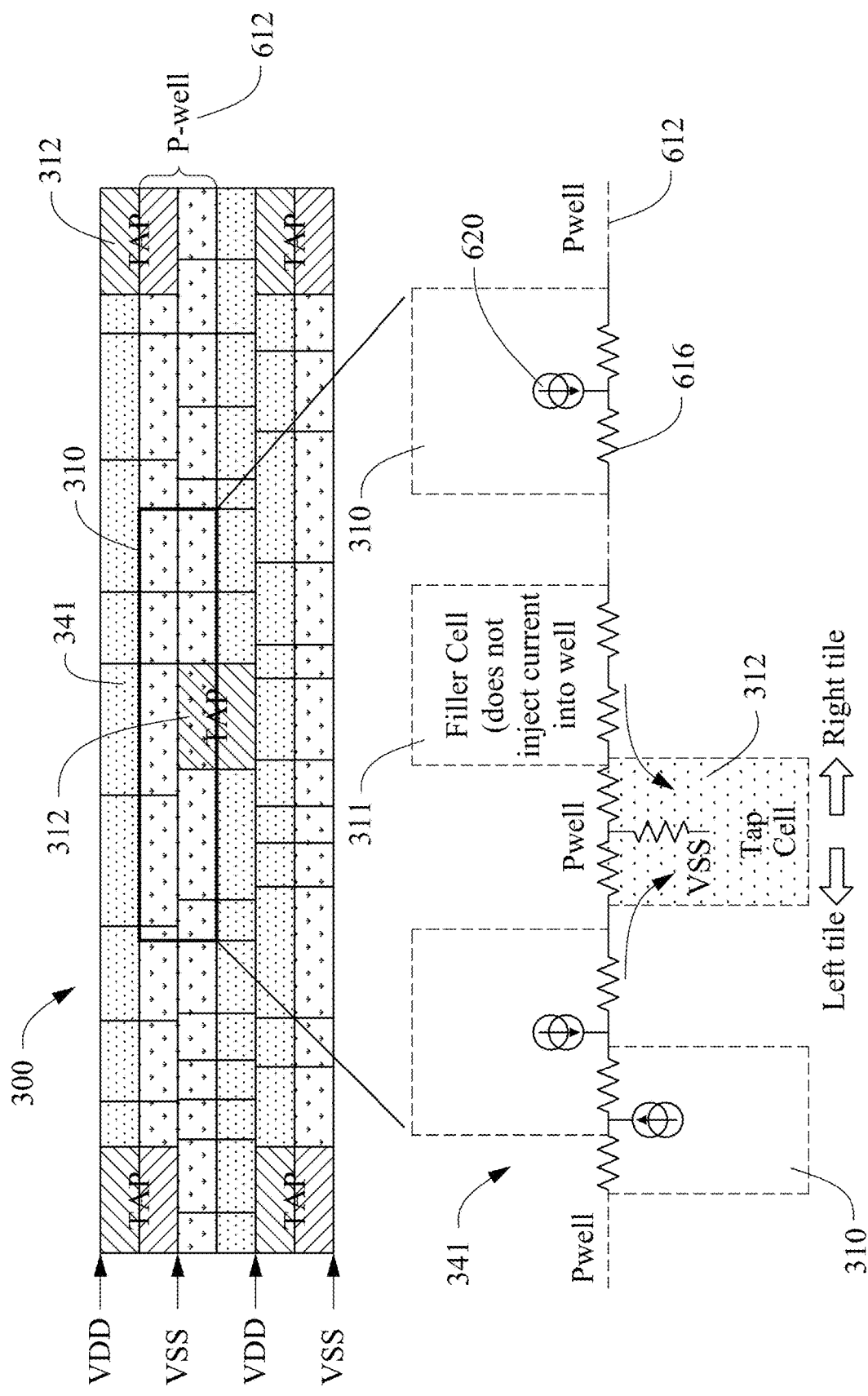
FIG. 9 illustrates another example of a cell modeling process in accordance with some embodiments.

FIGS. 8 and 9 illustrate additional aspects of the cell modeling process. FIGS. 8 and 9 each show a portion of a floor plan 300 that includes functional standard cells 310 and tap cells 312, as well as VDD and VSS voltage sources. Each of the standard cells 310 and the tap cells 312 are modeled as described in conjunction with FIGS. 6 and 7. In FIGS. 8 and 9, the model representations 340, 341 of the illustrated cells are shown below the floor plan 300, with the resistors 616 simulating the P-well. The models of the functional cells 310 include the current sources 620 that inject current from the middle of the cells 310 to the resistors 616 representing the P-well 612 to simulate the behavior of the appropriate functional cells 310. The models further include filler cells 311 that simply fill in an open space in the floor plan and do not inject current into the well. Based on the modeled aspects of the standard cells and other factors such as leakage and resistance (distance between tap cells 312 and functional cells 310), voltage droop across the various P-wells and N-wells of the floor plan may be determined. For simplicity only P-wells are illustrated in the models shown in FIGS. 8 and 9. In other examples, the models may further include N-wells.

Figure 10:
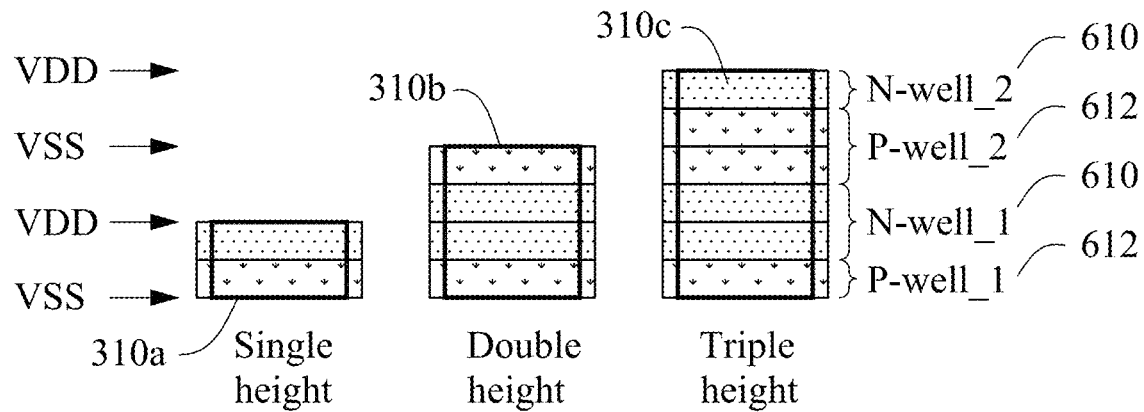
FIG. 10 illustrates aspects of another example of a tap cell modeling process in accordance with some embodiments.

FIG. 10 shows another modeling example where multiple height cells are modeled. Taller cells inject current into multiple P-well or N-well segments. Thus, the single height cell 310a injects current only into a single well. The double height cell 310b is symmetrical. For modeling purposes, it is assumed that the current is equally distributed into the multiple well segments. The triple height cell 310c is not symmetrical. Thus, each well segment is characterized separately when building cell models.

Generally, if voltage droop across a P-well or N-well exceeds some predetermined value at a given location, latchup risk is increased at that location. In some examples, a local well voltage exceeding 0.5 volts is likely to cause latchup.

Referring back to FIG. 5, the functional circuit design is received by the system 100 at operation 224. Based on the function design, an initial floor plan is created at operation 226, such as the floor plan 300 shown in FIG. 3A. Using the models for the functional cells 310 and tap cells 312, potential latchup positions are identified as indicated in operation 228. Latchup positions may be identified, for example, based on the determined voltage droop. Based on the determined latchup locations, the floor plan 300 is modified in operation 230. For example, modifying the floor plan could include moving functional cells 310 and/or tap cells 312, adding additional tap cells 312, using different types of tap cells 312, etc. to address identified latchup issues.

FIG. 3B shows an example where the floor plan 300 has been modified by adding additional tap cells 310a to some of the open areas 306 to address the determined potential latchup areas. In FIG. 3C, additional smaller tap cells 310b have been added to smaller open areas 306. Determining the locations and sizes for the added tap cells is discussed further herein below.

Figure 11:
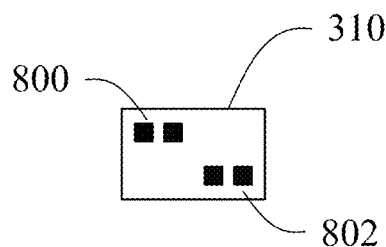
FIGS. 11-14 illustrate various examples of tap cell configurations in accordance with some embodiments.

FIGS. 11-14 illustrate examples of different tap cells 312 employed in various embodiments. In certain embodiments, a default tap cell 312 includes two P-well contacts 802 and two N-well contacts 800, as shown in FIG. 11. As noted above, the tap cells 312 are employed to prevent the undesirable latchup of integrated circuits, which can result from parasitic bipolar transistors formed in the integrated circuits. The tap cells 312 thus provide the P-well contacts 802 to couple the P-well or P-type substrates to the VSS power rails. The N-well contacts 800 are used to couple the N-well regions or N-type substrates to the VDD power rails. Providing additional P-well and/or N-well contacts may increase the size of the cell, but the additional contacts reduce resistance, providing additional current paths to reduce latchup.

Figure 12:
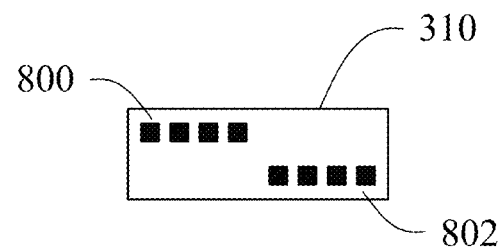
Figure 13:
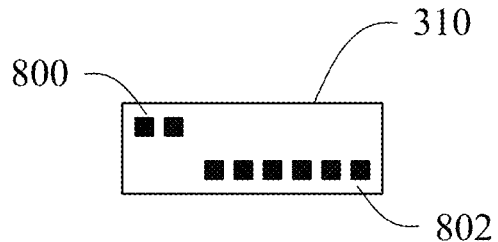
Figure 14:
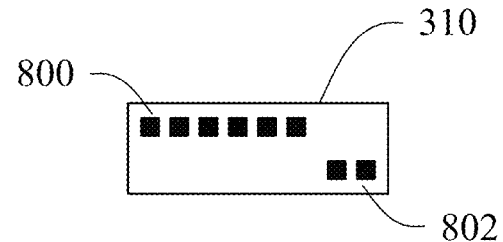

To reduce the contact resistance in floor plan locations that are critical for latchup, larger tap cells with additional contacts may be employed, such as the tap cell 312 shown in FIG. 12, which has four P-well contacts 802 and four N-well contacts 800. The larger tap cell 312 shown in FIG. 12 can also be configured, for example, in a 2+6 configuration (two N-well/six P-well contacts) as shown in FIG. 13, or in a 6+2 configuration as shown in FIG. 14 within the same cell area footprint as the version shown in FIG. 11. This provides lower contact resistance to either P-well or N-well contacts as desired to reduce latchup. Thus, 2+2 tap cell 312 of FIG. 11 could be used for non-critical latchup areas of the footprint, while the larger tap cell arrangements such as, for example, 4+4, 2+6, 6+2, etc. could be used for latchup critical areas.

Figure 15:
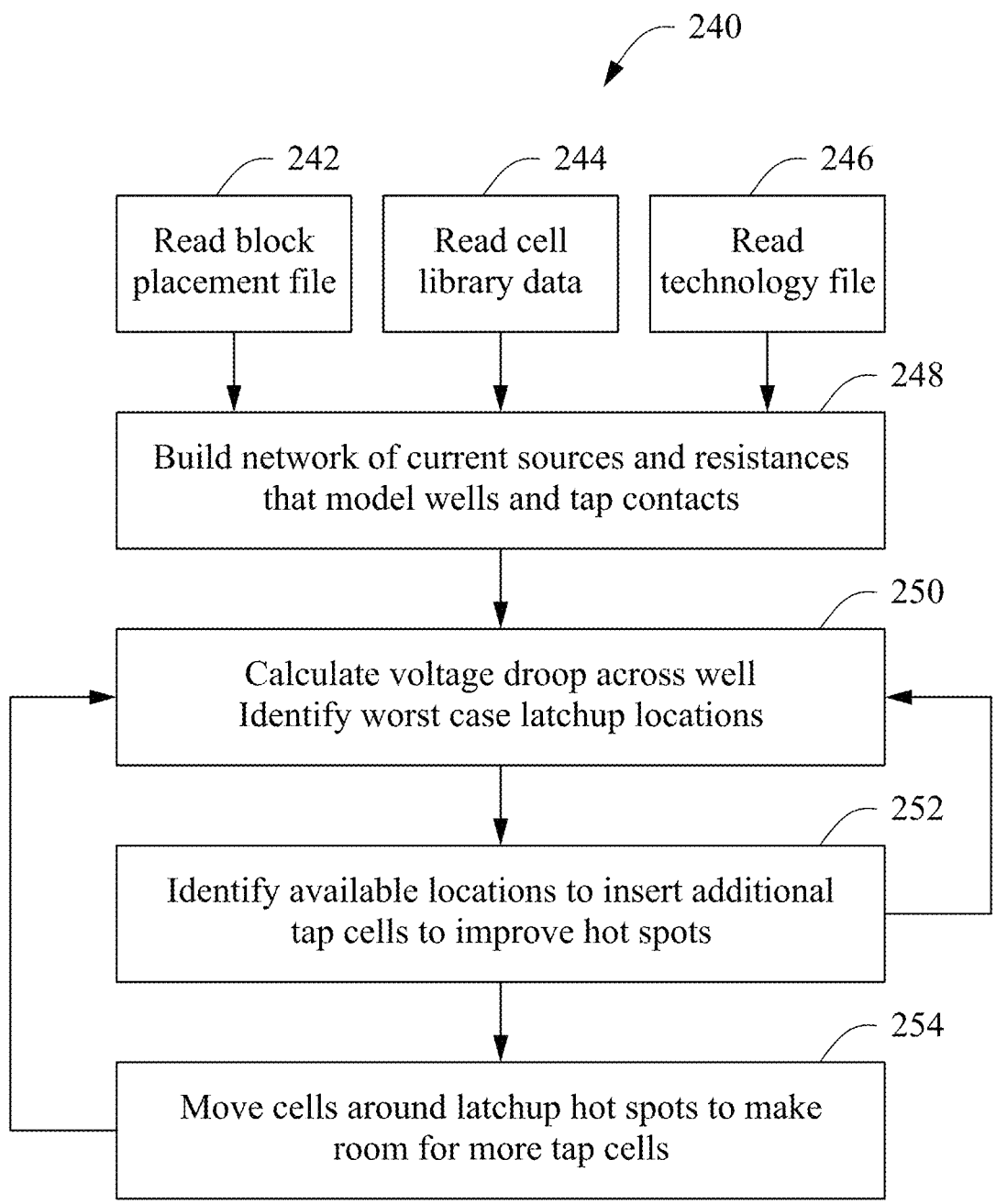
FIG. 15 is a process flow diagram illustrating aspects of an example of an integrated circuit design method in accordance with some embodiments.

FIG. 15 illustrates further aspects of an example integrated design process 240. As shown in FIGS. 2 and 5, a function design is received. Based on the received design, a block placement file is read in operation 242, cell data for the appropriate functional cells 310 is obtained from the cell library in operation 244, and a technology file is read in operation 246. Aspects of the functional cells 310 and tap cells 312 are modeled, including building a network of current sources and resistances for the cells that model the various wells and tap contacts as shown in operation 248 using the models shown in FIGS. 6-9, for example.

The floor plan is then examined, and based on the model information developed in operation 248, voltage droop across well locations is determined in operation 250 based on the models and other factors as described above in conjunction with FIGS. 6-9. If the voltage droop across a well location exceeds a predetermined value, such as 0.5 volts in some examples, a potential latchup location is identified. In this manner, potential latchup locations in a floor plan may be determined. Based on the determined latchup locations, available locations for inserting additional tap cells are identified in operation 252. As shown in FIGS. 3A-3C, available locations for placement of additional tap cells 312 could include the open spaces 306 in the floor plan 300 where functional cells 310 and tap cells 312 were not previously located. In some examples, the voltage droop calculations of operation 250 are then repeated to continue identifying and reducing latchup locations.

Still further, in some examples, functional cells 310 may be moved in response to the latchup location determination to create additional space for inserting additional tap cells, as shown in operation 254. The latchup location identification process 250 may be repeated following operation 254 to further reduce latchup hotspots. Thus, the process shown in FIG. 15 provides an iterative process for addressing and removing potential latchup hotspots.

Figure 16:
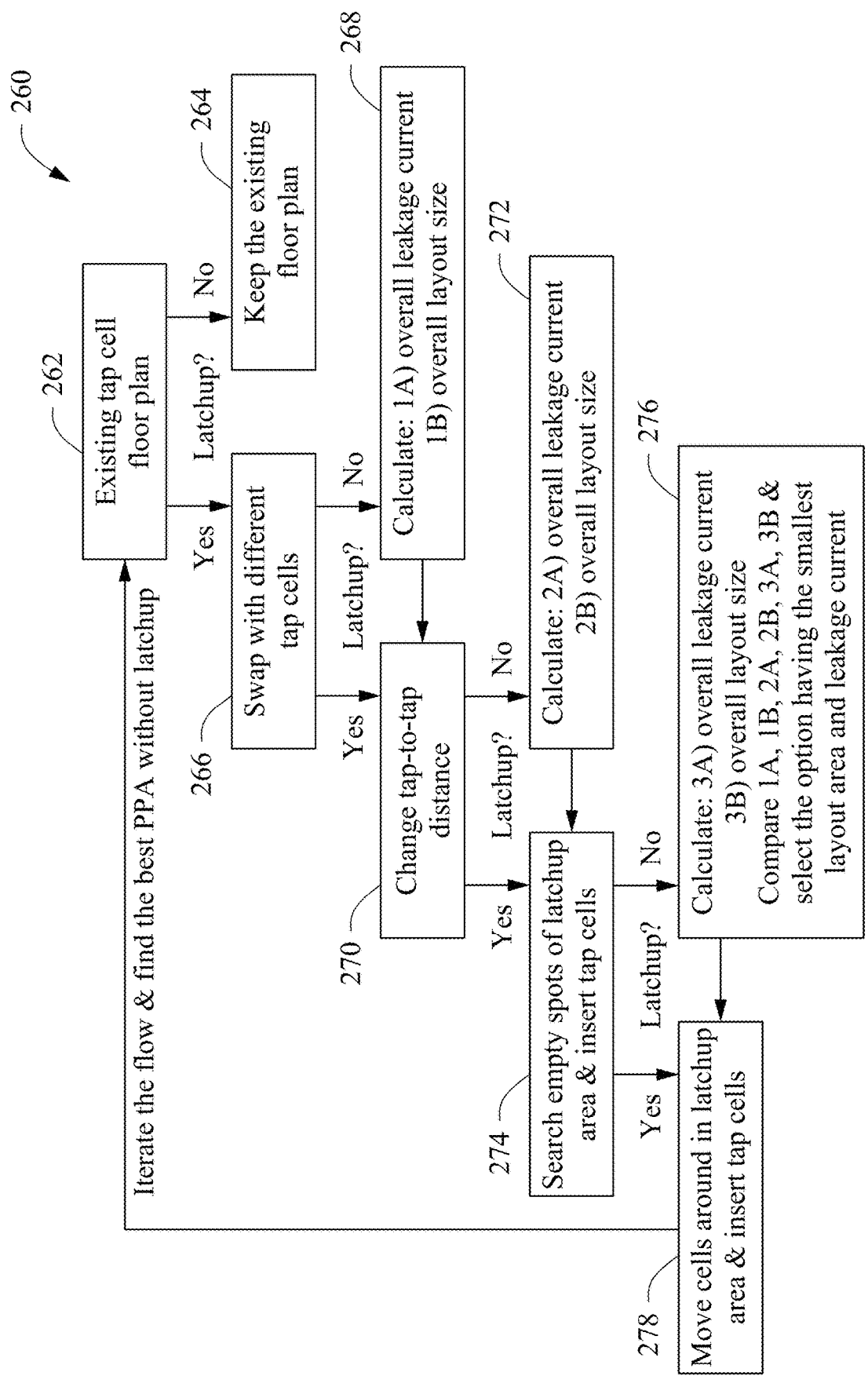
FIG. 16 is a process flow diagram illustrating aspects of another example of an integrated circuit design method in accordance with some embodiments.

FIG. 16 is a flow diagram illustrating still further aspects of the disclosed design process, illustrating a tap cell insertion process 260. The process 260 begins at block 262, where the existing floor plan is evaluated according to the process shown in FIG. 15, for example. If no latchup locations are identified, no changes to the floor plan are necessary and the existing floor plan is used as shown in operation 264.

If latchup locations are identified, the floor plan 300 is modified. In operation 266, one or more of the tap cells 312 of the existing floor plan 300 are swapped with different tap cell configurations. For instance, a standard 4+4 tap cell such as that shown in FIG. 11 could be replaced by a larger tap cell, such as those shown in FIGS. 12-14. In some implementations, the illustrated method is an iterative process to find an optimal balance between several factors such as latchup risk, leakage, floorplan size, etc. For instance, many additional tap cells and/or larger tap cells could be added in the operation 266 discussed above. While this may greatly reduce latchup risks, the additional and/or larger tap cells could result in other factors such as leakage or floorplan size unacceptably increasing. Thus, following operation 266, if no latchup areas are identified, overall leakage current for the floor plan 300 is determined in operation 268, based on the information regarding the functional cells 310 determined during the modeling process 248 of FIG. 15. Additional calculations are performed in some examples, such as determining the overall layout size of the floor plan.

Based on the leakage current and layout size determined in operation 268, tap-to-tap distances may be adjusted in operation 270 to make better use of the floor plan area, such as by reducing leakage and layout size. Additionally, if latchup locations are identified in operation 266, operation 270 may be executed to change tap-to-tap locations, thus addressing identified latchup hotspots.

If no latchup areas are identified following operation 270, overall leakage current for the floor plan 300 and overall layout size of the floor plan are again calculated in operation 272 to optimize the floorplan layout as noted above. In operation 274, if latchup areas or hotspots are identified following operation 270, areas near identified latchup locations are analyzed to identify open spaces 306 proximate to the latchup areas. Tap cells 312 may then be inserted in these areas to address latchup locations.

If no latchup areas are identified following operation 274, overall leakage current for the floor plan 300 and overall layout size of the floor plan are again calculated in operation 276 to optimize the device layout. Further, the overall leakage current and layout size calculations from operations 268, 272, and 276 are compared to select the floor plan arrangement having the smallest layout area and smallest leakage current while still adequately reducing latchup risks.

In operation 278, if latchup hotspots are identified following operation 274, functional cells in the latchup area may be relocated to make room for inserting additional tap cells. Following operation 278, the process 260 may be repeated to identify the best floor plan layout that avoids latchup issues.

Figure 17:
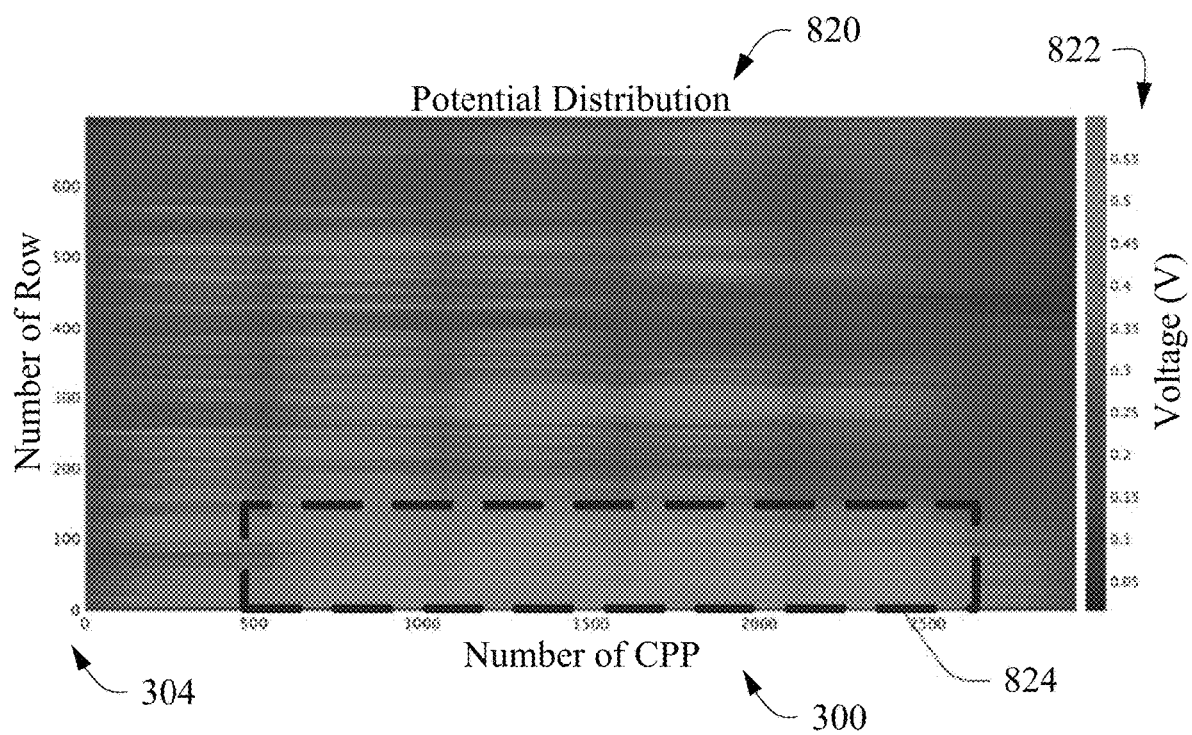
FIG. 17 illustrates an example of a two dimensional user interface display in accordance with some embodiments.
Figure 18:
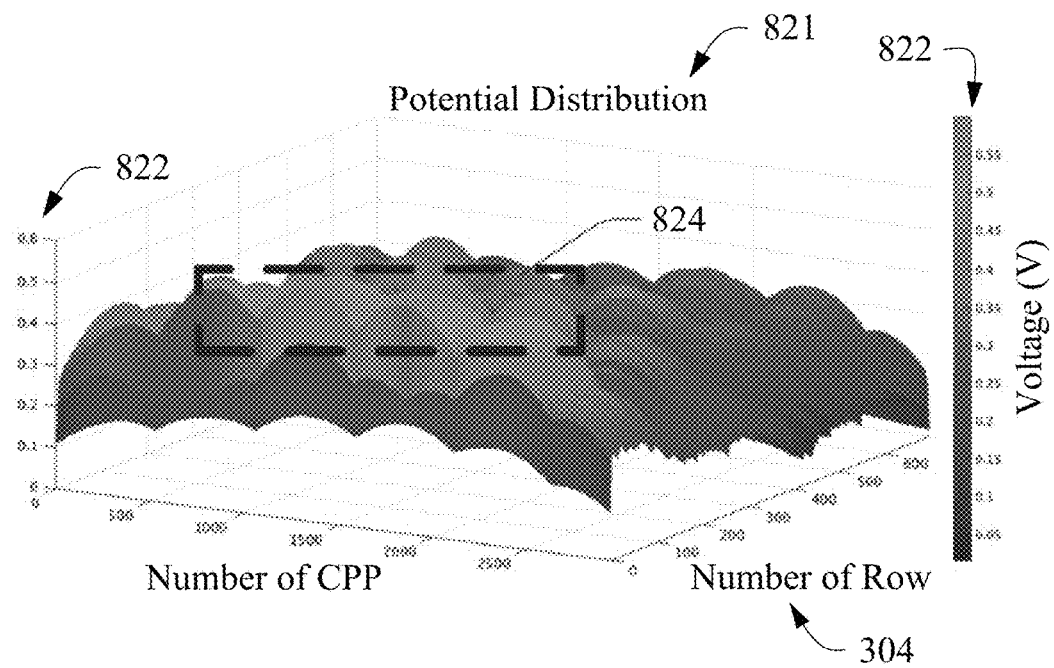
FIG. 18 illustrates an example of a three dimensional user interface display in accordance with some embodiments.

In accordance with still further aspects of the disclosure, latchup locations are displayed in a user interface to assist in addressing latchup issues. The user interface may be displayed via the display 114 of the system 100 shown in FIG. 1. FIGS. 17 and 18 illustrate example user interfaces 820, 821, where well voltages 822 are displayed for portions the rows 304 of the floor plan 300. The user interface 820 of FIG. 17 illustrates a two dimensional display, while the user interface 821 shown in FIG. 18 provides a three dimensional display. In an area 824, well voltage exceeds 0.5 volts, identifying a latchup critical area. This area 824 may thus be addressed using the various example processes disclosed herein for eliminating latchup critical areas.

Various disclosed embodiments thus provide procedures to determine latchup risk for place and route blocks and present the circuit designer a graphical representation of the latchup susceptibility across the design. Further, processes for reducing latchup risk in critical areas of a design, as well as options to minimize tap cell overhead in non-critical areas of the design are provided. Disclosed examples also illustrate adaptive solutions that are tailored to match the magnitude of the latchup risk and minimize tap cell overhead.

Disclosed embodiments include an integrated circuit that includes a substrate defining an outer periphery having a first border and a second border opposite the first border. A plurality of circuit elements are in or on the substrate arranged in a plurality of rows. The circuit elements are defined by standard layout cells selected from a cell library. The standard cells include tap cells, and the plurality of rows includes a first row that includes only tap cells.

In accordance with further disclosed embodiments, a method of designing an integrated circuit includes receiving an integrated circuit design. A floor plan for the integrated circuit design is determined. The floor plan includes an arrangement of a plurality of functional cells, where each of the functional cells are configured to perform a predefined function. The floor plan further includes a plurality of tap cells. Potential latchup locations are determined in the floor plan, and the arrangement of at least one of the functional cells or the tap cells is modified based on the determined potential latchup locations.

In accordance with still further disclosed embodiments, an integrated circuit design system includes a processor and computer readable media accessible by the processor. The computer readable media stores a cell library defining a plurality of functional cells configured to perform a predefined function and a plurality of tap cells, as well as instructions that when executed by the processor implement a method for designing an integrated circuit. The method includes receiving an integrated circuit design, and selecting a plurality of the functional cells from the cell library based on the functional integrated circuit design. The plurality of the functional cells are arranged into a floor plan, and a plurality of the tap cells are arranged into predetermined locations of the floor plan. Potential latchup locations in the floor plan are determined.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit design system, comprising:
   computer readable media accessible by the processor, the computer readable media storing a cell library defining functional cells configured to perform a predefined function, and tap cells, the computer readable media storing instructions that when executed by the processor implement a method, comprising:
   receiving an integrated circuit design;
   selecting a plurality of the functional cells from the cell library based on the integrated circuit design;
   arranging the plurality of the functional cells into a floor plan that includes a plurality of rows;
   arranging a plurality of the tap cells into the floor plan; and
   wherein the plurality of rows includes a first row that includes only tap cells.

2. The integrated circuit design system of claim 1, wherein the floor plan defines an outer periphery having a first border and a second border opposite the first border, the plurality of rows further includes a second row, wherein the first row is directly adjacent the first border and the second row is directly adjacent the second border, and wherein the first row and the second row include only tap cells.

3. The integrated circuit design system of claim 2, wherein:
   the floorplan is rectangular and further includes a third border and a fourth border, the third and fourth borders extending perpendicular to the first and second borders and between the first and second borders;
   wherein the floor plan includes tap cells arranged in a column extending parallel to the third and fourth borders.

4. The integrated circuit design system of claim 1, wherein the plurality of tap cells are configured to couple an n-well region to a VDD power rail and a p-well region to a VSS power rail, and wherein the plurality of tap cells each include a plurality of n-well contacts and a plurality of p-well contacts.

5. The integrated circuit design system of claim 4, wherein the plurality of tap cells each include an unequal number of the n-well contacts and the p-well contacts.

6. The integrated circuit design system of claim 2, wherein the floor plan includes additional rows positioned between the first and second rows that include a plurality of the functional cells and a plurality of the tap cells.

7. A method, comprising:
   providing a cell library defining functional cells each configured to perform a predefined function, and tap cells;
   receiving an integrated circuit design;

selecting a plurality of the functional cells from the cell library based on the integrated circuit design;

arranging the plurality of the functional cells into a floor plan, wherein the floor plan includes a plurality of rows;

arranging a plurality of the tap cells into the floor plan; and wherein the floor plan includes at least one row that contains only tap cells.

8. The method of claim 7, further comprising:

determining potential latchup locations in the floor plan; and modifying the arrangement of at least one of the functional cells or the tap cells based on the determined potential latchup locations.

9. The method of claim 8, wherein modifying the arrangement includes moving selected ones of the tap cells to different locations in the floor plan.

10. The method of claim 8, wherein modifying the arrangement includes adding additional tap cells to the floor plan.

11. The method of claim 8, wherein modifying the arrangement includes moving selected ones of the functional cells to different locations in the floor plan.

12. The method of claim 8, further comprising:

relocating at least some of the plurality of the tap cells arranged into the floor plan based on the determined potential latchup locations.

13. The method of claim 8, further comprising:

determining a layout size of the floor plan; and modifying the arrangement of at least one of the functional cells or the tap cells based on the determined layout size.

14. The method of claim 7, wherein:

the floor plan includes an outer periphery having a first border and a second border opposite the first border;

the plurality of rows including a first row directly adjacent the first border and a second row directly adjacent the second border; and wherein the at least one row that contains only tap cells includes at least one of the first row or the second row.

15. The method of claim 14, wherein the first and second rows each include only tap cells.

16. The method of claim 7, further comprising modeling AC and DC current of the functional cells.

17. The method of claim 16, wherein modeling the AC and DC current of the functional cells includes calculating leakage current for the functional cells.

18. A method, comprising:

providing a cell library defining a plurality of functional cells configured to perform a predefined function, and a plurality of tap cells;

receiving an integrated circuit design;

selecting a plurality of the functional cells from the cell library based on the integrated circuit design;

arranging the plurality of the functional cells into a floor plan, wherein the floor plan includes a plurality of rows;

arranging a plurality of the tap cells into predetermined locations of the floor plan;

modeling AC and DC current of the functional cells of the floor plan to determine voltage droop of the floor plan;

determining potential latchup locations in the floor plan based on the voltage droop of the floor plan; and wherein the floor plan includes at least one row that contains only tap cells.

19. The method of claim 18, further comprising modifying the arrangement of at least one of the functional cells or the tap cells based on the determined potential latchup locations.

20. The method of claim 18, wherein determining potential latchup locations in the floor plan based on the voltage droop of the floor plan includes determining whether the voltage droop exceeds a predetermined value.

* * * * *